United States Patent [19]
Vahidsafa

[11] Patent Number: 4,920,485
[45] Date of Patent: Apr. 24, 1990

[54] METHOD AND APPARATUS FOR ARBITRATION AND SERIALIZATION IN A MULTIPROCESSOR SYSTEM

[75] Inventor: Ali Vahidsafa, Tokyo, Japan

[73] Assignee: Amdahl Corporation, Sunnyvale, Calif.

[21] Appl. No.: 239,067

[22] Filed: Aug. 31, 1988

Related U.S. Application Data

[63] Continuation of Ser. No. 902,497, Sep. 2, 1986, abandoned.

[51] Int. Cl.$^5$ .............................................. G06F 13/14
[52] U.S. Cl. ................................ 364/200; 364/229.1; 364/230.3; 364/242.6; 364/271.5
[58] Field of Search ......................... 364/200 MS File

[56] References Cited

U.S. PATENT DOCUMENTS

| | | | |
|---|---|---|---|
| 3,676,860 | 7/1972 | Collier et al. | 364/200 |
| 4,223,380 | 9/1980 | Antonaccio et al. | 364/200 |
| 4,326,250 | 4/1982 | McCullough | 364/200 |
| 4,356,546 | 10/1982 | Whiteside et al. | 364/200 |
| 4,430,699 | 2/1984 | Segarra et al. | 364/200 |
| 4,466,063 | 8/1984 | Segarra et al. | 364/200 |
| 4,482,954 | 11/1984 | Vrielink et al. | 364/200 |
| 4,584,643 | 4/1986 | Halpern et al. | 364/200 |
| 4,689,619 | 8/1987 | O'Brien, Jr. | 340/825.08 |

Primary Examiner—Gareth D. Shaw
Assistant Examiner—Maria Napiorkowski
Attorney, Agent, or Firm—Fliesler, Dubb, Meyer & Lovejoy

[57] ABSTRACT

A method and apparatus for providing arbitration between and serialization of plural processors in a multiprocessor system comprising, in each processor, a delay network, a priority circuit, a REQUEST generator, an ORDER generator, a serialization program, an ACK generator and an ACK receiver. In operation, the delay network insures that simultaneously generated REQUESTS received from plural processors are received by the priority circuit at the same time. A processor awarded priority issues an ORDER to the other processors and thereafter drops its REQUEST to allow an award of priority to another processor. An ACK is received by the ORDER issuing processor from each processor when it executes the ORDER. The ORDER issuing processor then completes the task which gave rise to the ORDER. To conserve processing time, priority awards may be made before previously issued ORDERS are completed. Alternatively, REQUEST issuing processors can simply hold their REQUEST and thereby prevent interruption of instructions or groups of instructions.

9 Claims, 5 Drawing Sheets

FIG.—1

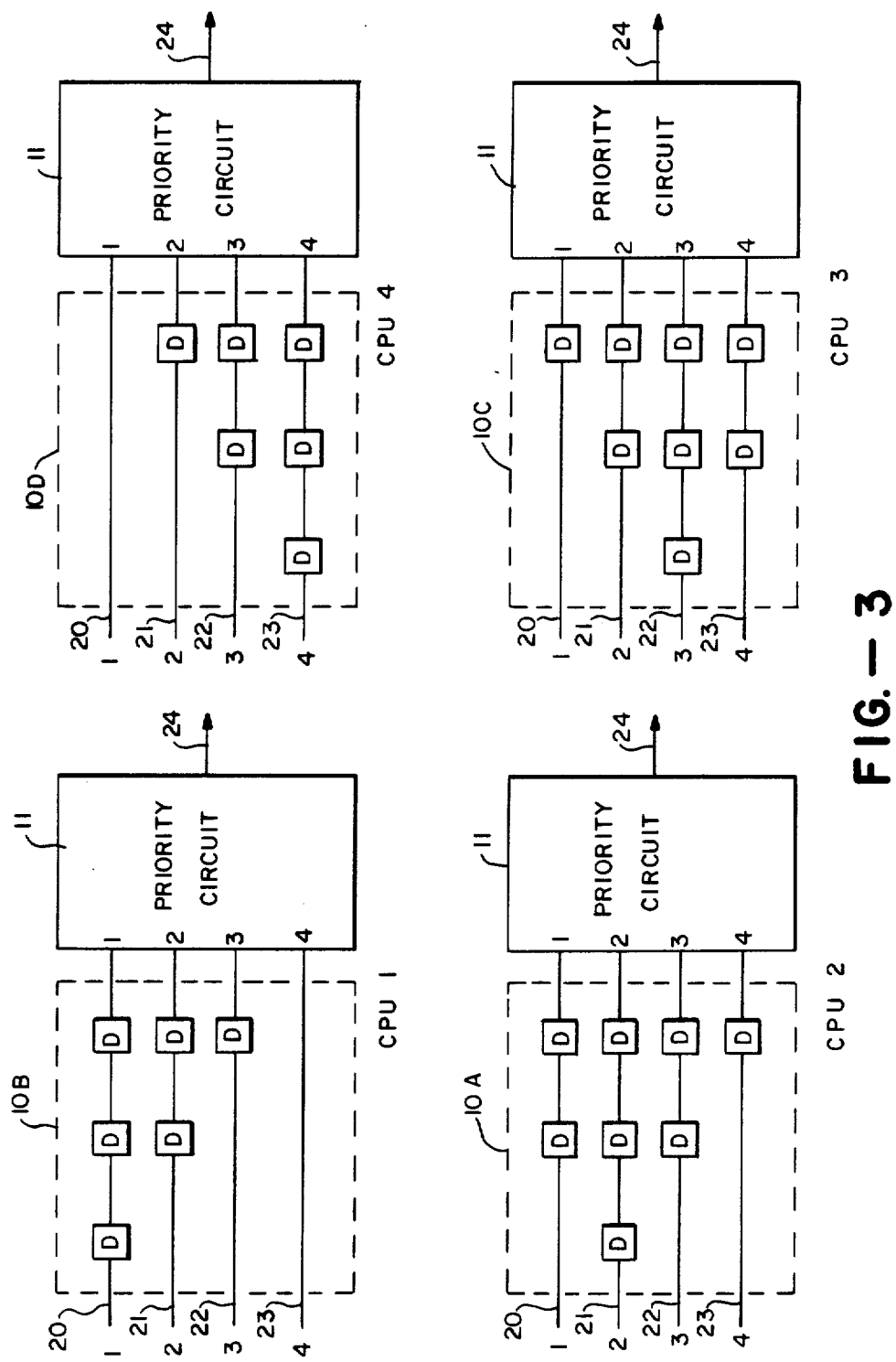
FIG.—3

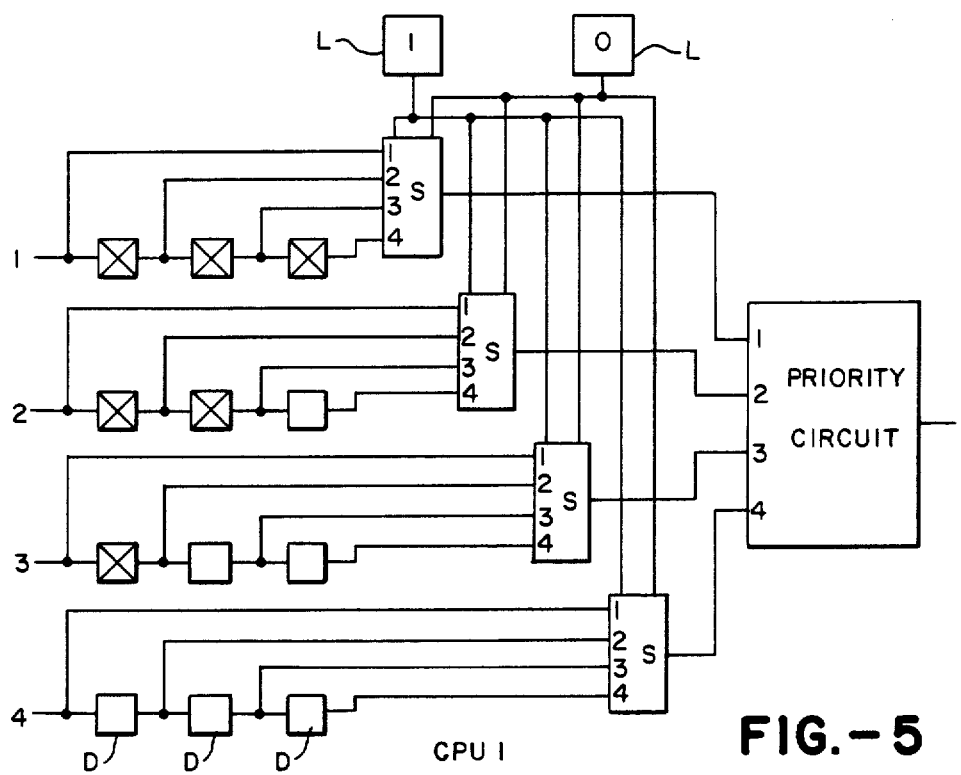
FIG.—5
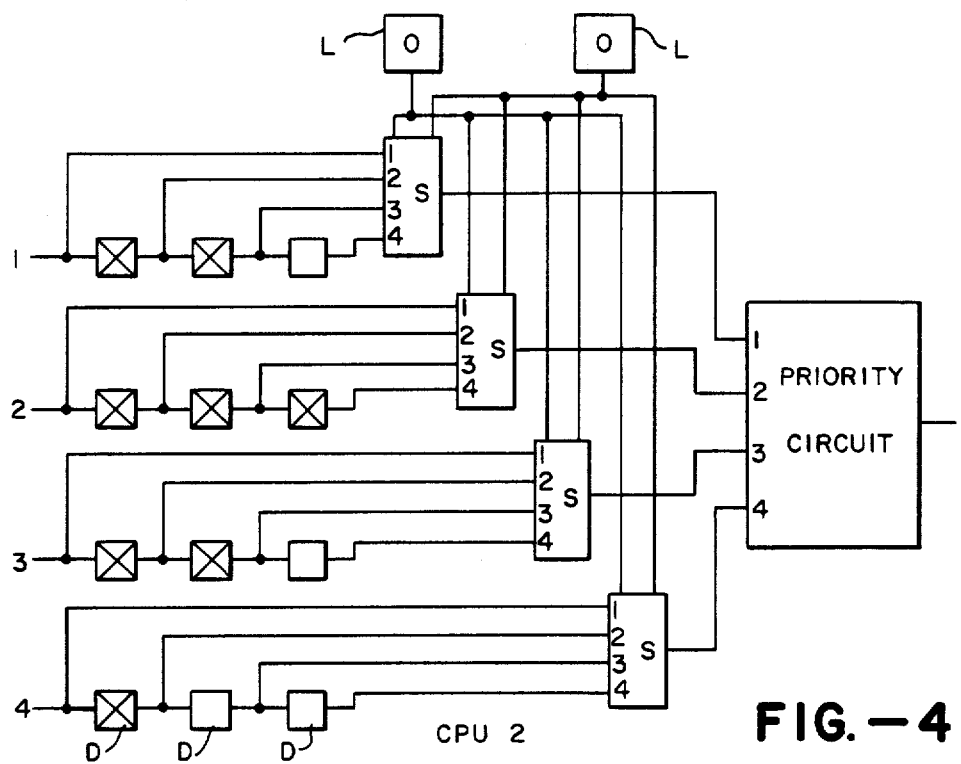
FIG.—4

METHOD AND APPARATUS FOR ARBITRATION AND SERIALIZATION IN A MULTIPROCESSOR SYSTEM

This application is a continuation of co-pending application Ser. No. 06/902,497, filed Sept. 2, 1986, now abandoned.

BACKGROUND OF THE INVENTION

1. Technical Field

The present invention relates to multiprocessor systems in general and to a method and apparatus for arbitration between and serialization of plural processors in a multiprocessor system in particular.

2. Description of Prior Art

A multiprocessor system comprises a plurality of processors which are coupled to each other directly or indirectly through one or more other processors. The coupling of processors in such a system comprises the coupling of data and/or control signal buses of one processor and corresponding data and/or control signal buses of one or more other processors in the system. For example, in a multiprocessor system comprising four processors designated first, second, third and fourth, respectively, the processors may be coupled in an arrangement such that the first processor is coupled directly to the second processor and indirectly through the second processor to the third and fourth processors; the second processor is coupled directly to the first and third processors and indirectly through the third processor to the fourth processor; the third processor is coupled directly to the second and fourth processor and indirectly through the second processor to the first processor; and the fourth processor is coupled directly to the third processor and indirectly through the third processor to the second and first processor.

In operation, a central processing unit (CPU) in the system in the course of executing instructions may encounter instructions which require it to request special operations of the other CPU's in the system. For example, some instructions have a requirement that when executed on a CPU the results produced by instructions previously executed on the CPU must be available and visible to other CPUs and channels in the system before the results of the current instruction. Specific results of prior instructions which must be available to other CPU's and channels before the results of a current instruction include storage accesses and translation look aside buffer purge orders. Such an instruction, executed on the requesting CPU, must initiate operations on all other CPU's before the unit of operation on the requesting CPU is completed. A unit of operation is defined as a predetermined amount of work that cannot be interrupted. Furthermore, the operations initiated on each of the other CPU's in the system must be initiated between units of operation on those CPU's. The operations initiated on each of the nonrequesting CPU's, which places all nonrequesting CPU's in a predetermined state, are collectively known as serialization.

In general, the serialization of a processor in a multiprocessor system comprises forcing the processor to complete certain operations and forcing the processor to a state where it will not initiate new operations. For example, operations which are completed during serialization of a processor are specific to each processor, but typically include completing the current unit of operation, completing stores to system memory and local processor caches, and completing any pending updates to local processor translation lookaside buffers.

At times, more than one processor in a multiprocessor system may request serialization of another processor in the system at the same time. When this occurs, the requesting processors must be awarded priority according to a predetermined scheme. The awarding of priority is called arbitration.

The awarding of priority among processors in a multiprocessor system requires special circuits for providing the necessary control signals. Heretofore, the necessary control signals for awarding priority have been generated using a priority logic circuit which is common to all processors in the system. While there are certain advantages in using a common priority logic circuit, it has been found that the use of a common priority logic circuit results in a complex array of control signal lines, unpredictable signal delays and difficulties in maintaining the system in an operable condition because a failure in the common priority circuit affects all CPU's in the system.

Another disadvantage of the prior known arbitration and serialization methods and apparatus was that, heretofore, it was not possible to separate arbitration from serialization so that instructions could protect themselves with the arbitration priority grant mechanism without the overhead of a global serialization. If this had been available, it would have allowed the other CPU's in the system to proceed as normal unless they attempt to perform an operation that also requires arbitration.

In addition to the above-described limitations of prior known arbitration methods and apparatus, prior known arbitration was not possible over multiple instructions. For example, in a certain mode, called Fast Assist Mode (FAM), instructions can be grouped together to function as a single unit of operation. By allowing the arbitration grant to be held over multiple instructions, deadlock conditions which could occur when an instruction needing arbitration or serialization is included in the group of instructions are prevented. Without this facility, either these instructions must be prevented from occurring in FAM with the resulting loss of function, or, when they do occur, the software must cause an exit from FAM to perform the instruction, then a return to FAM once it is completed. Both of these solutions would cause a considerable degradation in performance and/or function compared to the method and apparatus proposed herein.

SUMMARY OF THE INVENTION

In view of the foregoing, principal objects of the present invention are a novel method and apparatus for arbitration between and serialization of plural central processing units (CPU's) in a multiprocessor system.

In accordance with the above objects there is provided in each of the CPU's in the system an instruction processor, a means for registering a REQUEST PERMISSION TO SERIALIZE OTHER CPU's control signal (REQUEST), a plural input priority circuit, a delay network coupled to the inputs of the priority circuit, means for generating a SERIALIZE YOURSELF control signal (ORDER), a serialization circuit, means for generating a SERIALIZATION COMPLETE ACKNOWLEDGED control signal (ACK) for use by other CPU's in the system, means for transmitting the above-described control signals between all CPU's in the system, an ACKNOWLEDGE control signal receiver, a local serialization circuit and a means for generating an ARBITRATION/SERIALIZATION COMPLETE control signal for use by the instruction processor.

The delay network coupled to the inputs of the priority circuit in each of the CPU's is provided so that REQUEST's simultaneously generated by a plurality of CPU's in the system will be received by each of the priority circuits at the same time. More specifically, there is provided in each of the delay networks, a delay circuit which is coupled in series with selected inputs of the priority circuit. The magnitude of the delay provided by each delay circuit is chosen to be inversely proportional to the time it takes to transmit a REQUEST from a CPU in the system to the input of the priority circuit to which the delay circuit is coupled.

In a preferred embodiment of the invention, the delay network comprises a selector circuit for selecting the amount of delay to be placed in series with an input of a priority circuit. For example, if for purposes of repair or replacement, CPU's are moved within the system or a CPU is replaced in the system, a simple setting of the selector circuit which depends on the location of the delay network in the system is all that is required for providing the required amount of delay in the delay network. Also, if the system is reconfigured from a multiprocessor system to a dual processor or uniprocessor, advantage can be taken of the decrease in the amount of delay needed.

In operation, if a CPU requires serialization of another CPU in the system, it generates a REQUEST for permission to serialize the other CPU's and sends it to all of the other CPU's in the system. If a plurality of CPU's generate simultaneous REQUEST's, the priority circuit in each of the CPU's awards priority to one of the CPU's. Since the priority circuits in all of the CPU's are identical, each of them makes the same decision and therefore, there is no need to transmit the decision to the other CPU's. The CPU awarded priority then performs a local serialization operation, generates an ORDER ordering the other CPU's to serialize themselves and drops its REQUEST. The dropping of the REQUEST allows one of the other requesting CPU's to be awarded priority while it and the other CPU's are being serialized. While an ORDER is pending, however, no other CPU will issue an ORDER. As each nonrequesting CPU completes its serialization, it generates an ACK control signal indicating that it has completed its serialization. When the requesting CPU issuing an ORDER has received the ACK signals indicating that all of the other CPU's have completed their serialization and the requesting CPU has completed its serialization, a control signal is sent to the instruction processor, the requesting CPU completes the task which gave rise to its REQUEST and drops its ORDER. Thereafter, the next CPU then having priority performs a local serialization operation, issues its ORDER and the above-described process is repeated.

At times a CPU executes an instruction or group of instructions, the execution of which cannot be interrupted. To prevent another CPU in the system from making a REQUEST and being awarded priority, the former CPU makes and holds a REQUEST until it completes its execution of the instruction or the group of instructions. In this manner, the method and apparatus of the present invention is able to prevent disruptive interruptions of specific instructions without resorting to more expensive hardware or software implementations heretofore required.

BRIEF DESCRIPTION OF THE DRAWING

The above and other objects, features and advantages of the present invention will become apparent from the following detailed description of the accompanying drawing in which:

FIG. 3 is a block diagram of one embodiment of fixed delay networks and priority circuits in the central processing units of FIG. 1; and FIGS. 4-7 are block diagrams of an embodiment of programmable delay networks and priority circuits in the central processing units of FIG. 1.

DETAILED DESCRIPTION OF THE DRAWING

Figure 1:
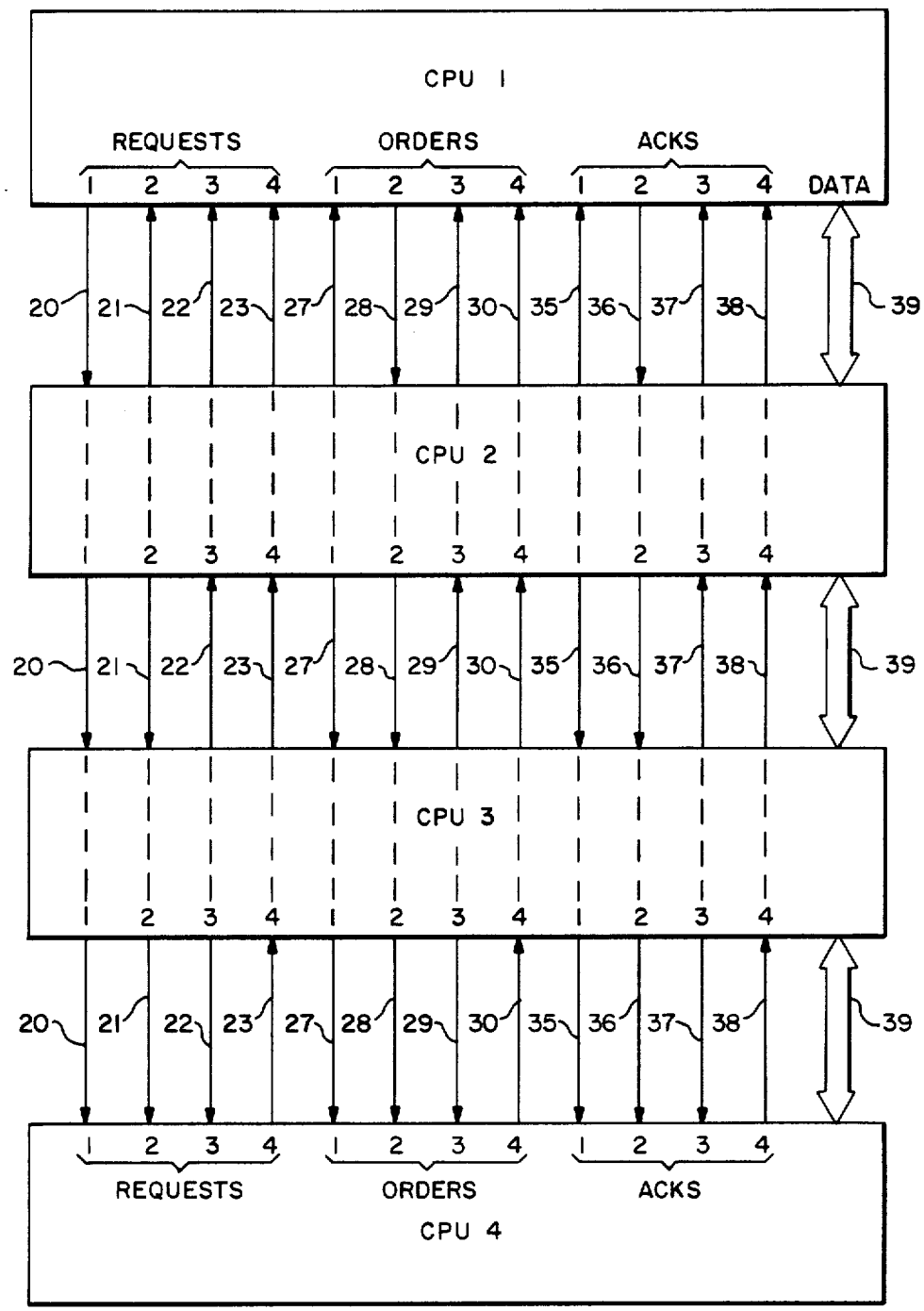
FIG. 1 is a block diagram of a multiprocessor system comprising four central processing units according to the present invention.

Referring to FIG. 1, there is provided in accordance with the present invention a multiprocessor system designated generally as 1. In the system 1 there is provided a plurality of central processing units (CPU's) designated generally as CPU 1, CPU 2, CPU 3 and CPU 4. All of the CPU's are interconnected by a plurality of REQUEST signal lines 20-23, ORDER signal lines 27-30, and acknowledge (ACK) signal lines 35-38. A plurality of broken lines are used to show that signals on each of the lines pass through CPU's 2 and 3 to adjacent CPU's after being latched and synchronized with system clocks located therein.

Figure 2:
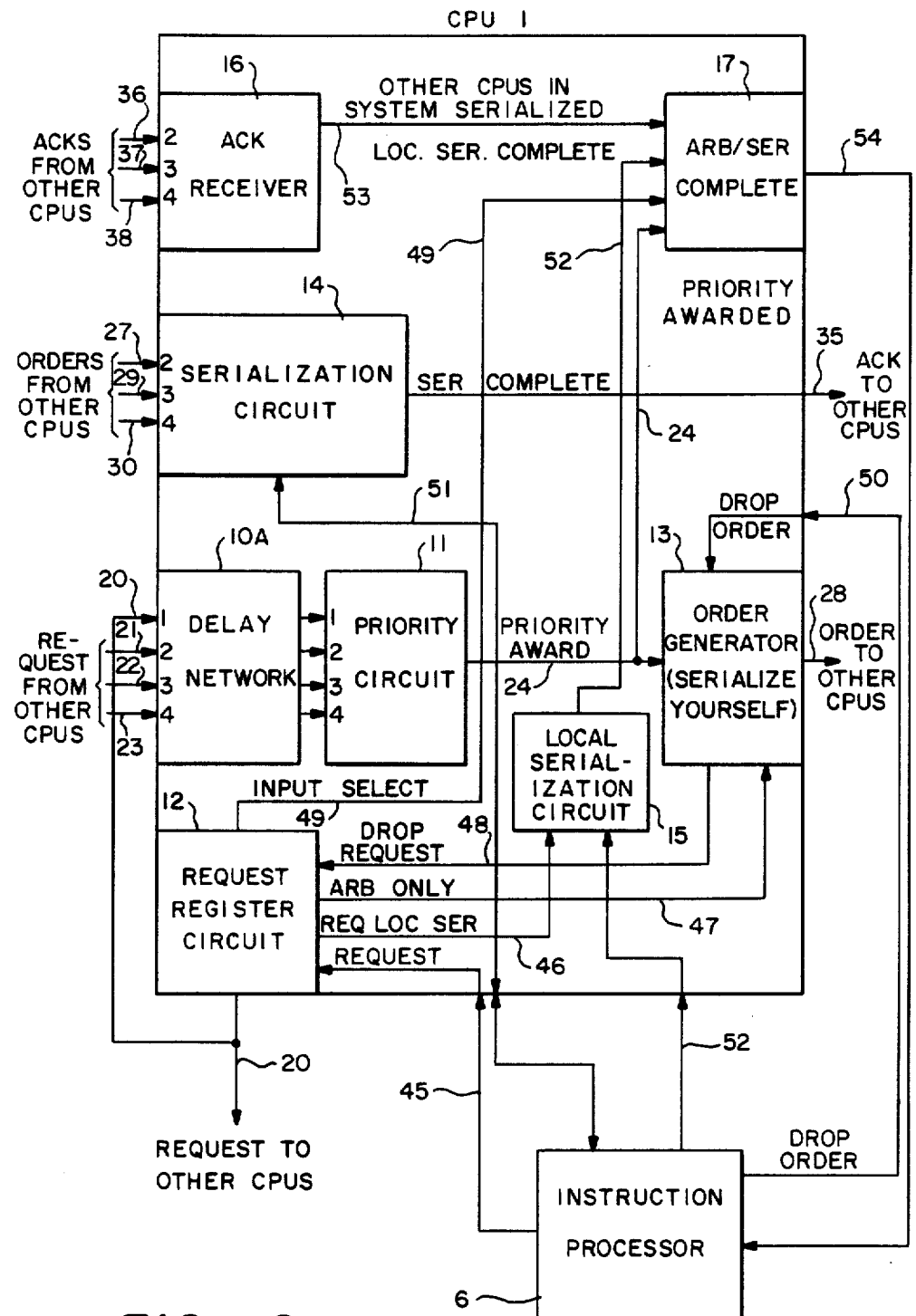
FIG. 2 is a more detailed block diagram of one of the central processing units of FIG. 1.
Figure 7:
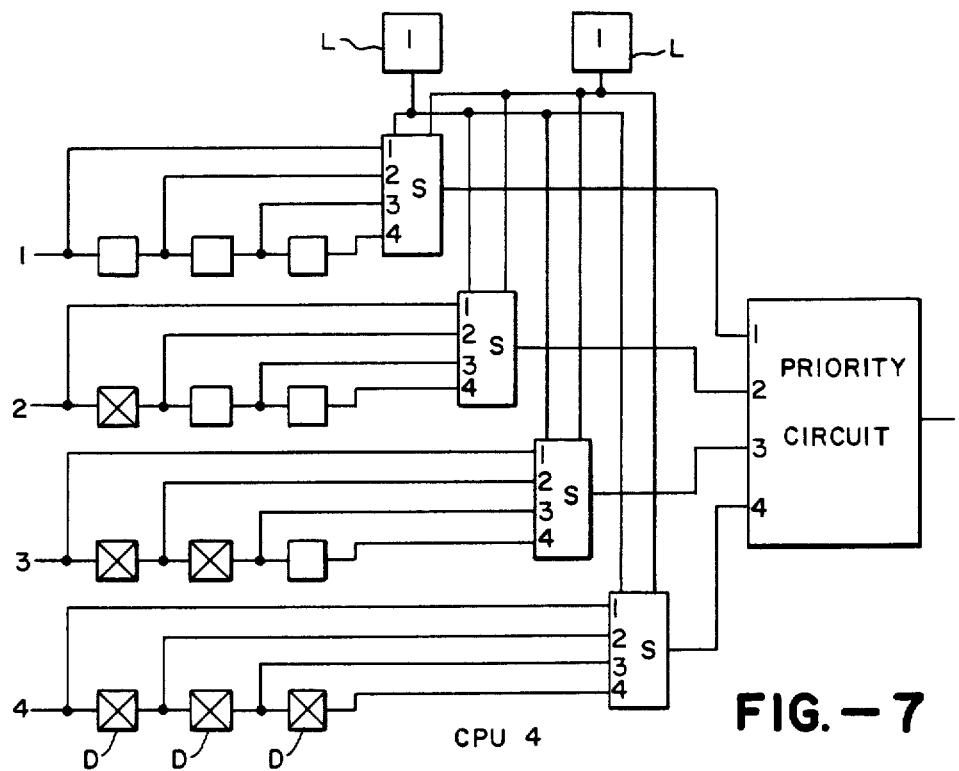
Figure 6:
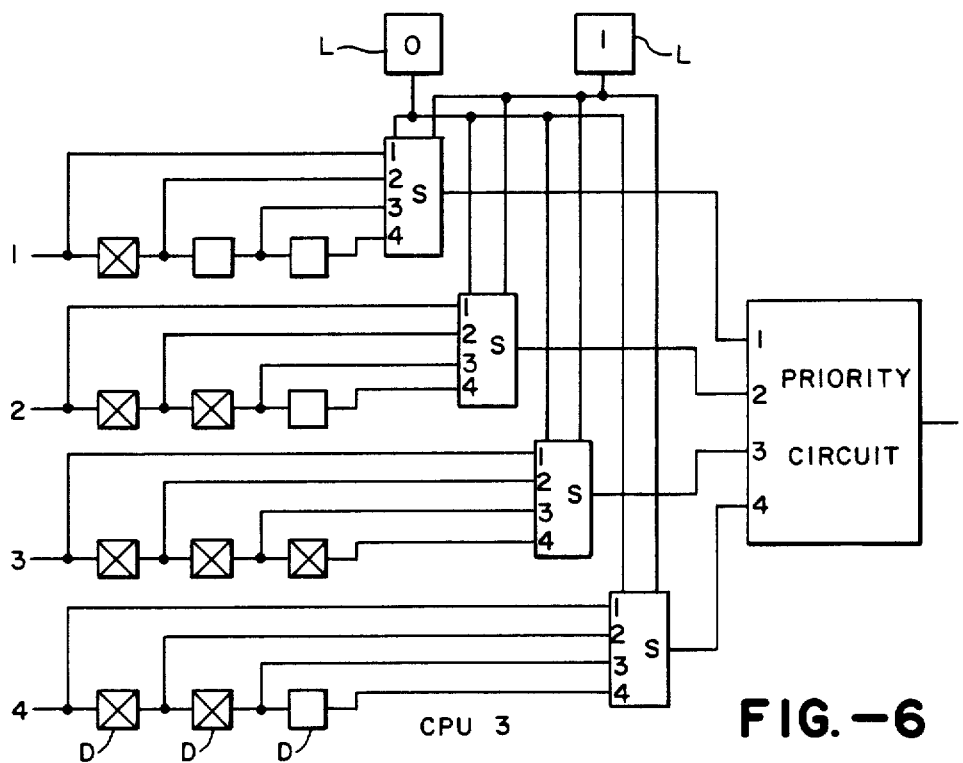

In each of the CPU's 1-4, as seen more clearly in FIG. 2 which is a block diagram of CPU 1 and typical of the other CPU's, there is provided an instruction processor 6, a priority circuit 11, a request register circuit 12, an order generator 13, a serialization circuit 14, a local serialization circuit 15, an ACK receiver 16 and an arbitration/serialization (ARB/SER) complete circuit 17. In addition, there is provided in the CPU's 1-4, a plurality of delay networks 10A, 10B, 10C and 10D, respectively.

As will be further described below, each of the delay networks 10A-10D comprises four inputs 1-4 which are coupled to control signal lines 20, 21, 22 and 23, respectively, and four outputs coupled to corresponding inputs of the priority circuit 11. The inputs 1-4 are designated 1-4 to conveniently identify the CPU from which they are derived. For example, input 1 is derived from CPU 1, input 2 is derived from CPU 2, and so on. This identification scheme is also used with respect to the serialization circuit 14 and ACK receiver 16.

In the priority circuit 11 there is provided an output coupled to an output control signal line 24.

In the request register circuit 12 there is provided an input coupled to an output of the instruction processor 6 by means of a REQUEST control signal line 45, an output coupled to an input of the local serialization circuit 15 by means of a REQUEST LOCAL SERIALIZATION control signal line 46, an output coupled to an input of the order generator 13 by means of an ARBITRATION ONLY control signal line 47, an input coupled to an output of the order generator 13 by means of a DROP REQUEST control signal line 48, an output coupled to an input of the ARB/SER complete circuit 17 by means of an input SELECT control signal line 49 and an output coupled to one of the control signal lines 20–23.

In the order generator 13 there is also provided an input coupled to an output of the instruction processor 6 by means of a DROP ORDER control signal input line 50 and an output coupled to one of the ORDER control signal lines 27–30.

In the serialization circuit 14 there is provided three inputs coupled to three of the ORDER control signal lines 27–30, a fourth input coupled to an output of the instruction processor 6 by means of a control signal line 51 and an output coupled to one of the SERIALIZATION COMPLETE (ACK) control signal lines 35–38.

In the LOCAL SERIALIZATION circuit 15 there is also provided an input coupled to an output of the instruction processor 6 by means of a control signal line 52 and an output coupled to an input of the ARB/SER COMPLETE circuit 17 by means of a LOCAL SERIALIZATION COMPLETE control signal line 52.

In the ACK receiver 16 there are provided a plurality of control signal inputs coupled to three control signal lines 35, 37 and 38 and an OTHER CPU's SERIALIZED control signal output coupled to an input of the circuit 17 by means of a control signal line 53.

In the ARB/SER circuit 17 there is also provided an output coupled to an input of the instruction processor 6 by means of control signal line 54.

In operation, when an instruction in the instruction processor 6 in one of the CPU's 1–4 requires another one of the CPU's 1–4 in the system to perform a specific operation, it requests permission to serialize the other CPU's, i.e. requests priority, by generating in its instruction processor 6 a REQUEST PERMISSION TO SERIALIZE OTHER CPU's control signal (REQUEST). The REQUEST is then transmitted by the CPU to the REQUEST register 12 on the line 45, and via the register 12, to its own priority circuit 11 and to the priority circuit 11 in each of the other CPU's via one of the control signal lines 20–23 and the delay networks 10A–10D associated therewith. For example, CPU 1 uses line 20, CPU 2 uses line 21, CPU 3 uses line 22 and CPU 4 uses line 23.

Referring to FIG. 3, the time it takes for each REQUEST to be received by a CPU depends on the relative location of the sending and receiving CPU's in the system and is characterized in terms of units of delay. If the sending and receiving CPU's are one and the same, there is obviously no delay. If the sending and receiving CPU's are coupled directly, there is 1 unit of delay. If the sending and receiving CPU's are separated by 1 CPU, there are 2 units of delay. If the sending and receiving CPU's are separated by 2 CPU's, there are 3 units of delay, For example, in the 4 CPU system described above with respect to FIG. 1, the units of delay are as follows:

TABLE 1

| RECEIVER | SENDER | UNITS OF DELAY |
|---|---|---|
| 1 | 1 | 0 |
| 1 | 2 | 1 |
| 1 | 3 | 2 |
| 1 | 4 | 3 |
| 2 | 1 | 1 |
| 2 | 2 | 0 |
| 2 | 3 | 1 |
| 2 | 4 | 2 |
| 3 | 1 | 2 |
| 3 | 2 | 1 |
| 3 | 3 | 0 |

TABLE 1-continued

| RECEIVER | SENDER | UNITS OF DELAY |
|---|---|---|
| 3 | 4 | 1 |
| 4 | 1 | 3 |
| 4 | 2 | 2 |
| 4 | 3 | 1 |
| 4 | 4 | 0 |

The priority circuits in all of the CPU's are identical and each of them awards priority to itself or to another CPU in the system independently of the priority circuits in the other CPU's. Consequently, when two or more CPU's simultaneously request priority, i.e. request permission to serialize the other CPU's in the system, it is necessary that all of the priority circuits receive the REQUESTS from the other CPU's simultaneously.

To make sure that all of the priority circuits in all of the CPU's receive the REQUESTS from the other CPU's simultaneously, delay circuits D are provided for delaying the REQUESTS received by the priority circuits from certain ones of the CPU's. The number of units of delay which is provided depends on the relative location of the sending and receiving CPU's in the system. Thus, if the sending and receiving CPU is one and the same, the number of units of delay provided is the maximum number of units of delay provided at any input of a priority circuit in a CPU in the system and is equal to the signal delay between a receiving CPU and the remotest sending CPU in the system. If the sending and receiving CPU's are coupled directly, the delay provided is 1 unit less than the maximum. If the sending and receiving CPU's are separated by one CPU, the delay provided is 2 units less than the maximum. If the sending and receiving CPU's are separated by 2 CPU's, the delay provided is 3 units less than the maximum, etc. For example, in the 4 CPU system described above with respect to FIGS. 1 and 3, the delays provided are as follows:

TABLE 2

| RECEIVER | SENDER | UNITS OF DELAY |
|---|---|---|
| 1 | 1 | 3 |
| 1 | 2 | 2 |
| 1 | 3 | 1 |
| 1 | 4 | 0 |
| 2 | 1 | 2 |
| 2 | 2 | 3 |
| 2 | 3 | 2 |
| 2 | 4 | 1 |
| 3 | 1 | 1 |
| 3 | 2 | 2 |
| 3 | 3 | 3 |
| 3 | 4 | 2 |
| 4 | 1 | 0 |
| 4 | 2 | 1 |
| 4 | 3 | 2 |
| 4 | 4 | 3 |

Each of the above-described delay circuits D comprises one unit of delay.

Referring to FIGS. 4–7, in a preferred embodiment of the present invention, there is provided a plurality of programmable delay networks. Each of the networks can be easily programmed for placing the necessary amount of delay in series with each of the inputs of the priority circuit to which it is connected. Once the required maximum number of units of delay for any input of a priority circuit in the system is determined, each of the inputs to each of the priority circuits is provided with the maximum number of delay circuits D and a multi-input selector circuit S which is responsive to one or more latches L for coupling the required number of said delay circuits D in series with each such input. Thus, if an input to a priority circuit requires 3 units of delay, the selector circuit S in response to a control signal from the latches L will couple 3 of said delay circuits D in series with said input. If an input to another priority circuit requires 2 units of delay, the selector circuit S in response to another control signal from the latches will couple 2 of said delay circuits D in series with said input, etc.

For example, in the 4 CPU system described above with respect to FIG. 1, the inputs of the selector circuits for each receiver and sender combination are as follows:

| RECEIVER | CODE | SENDER | SELECTOR INPUTS |
|---|---|---|---|
| 1 | 10 | 1 | 4 |
| 1 |  | 2 | 3 |
| 1 |  | 3 | 2 |
| 1 |  | 4 | 1 |
| 2 | 00 | 1 | 3 |
| 2 |  | 2 | 4 |
| 2 |  | 3 | 3 |
| 2 |  | 4 | 2 |
| 3 | 01 | 1 | 2 |
| 3 |  | 2 | 3 |
| 3 |  | 3 | 4 |
| 3 |  | 4 | 3 |
| 4 | 11 | 1 | 1 |
| 4 |  | 2 | 2 |
| 4 |  | 3 | 3 |
| 4 |  | 4 | 4 |

With identical priority, delay and selector circuits in each of the CPU's in the system, a CPU can be replaced by another CPU or exchanged with another CPU in the system and, from the foregoing description, it can be seen that all that is required to be done to accommodate the change is that the latches L controlling the selector circuits S therein be set to identify the location of the CPU in the system.

The setting of the latches L to identify the location of the CPU in the system may be done by means of a conventional keyboard coupled to the CPU, switches on the CPU or by means of appropriate electrical signals coupled through a connector to the CPU when the CPU is inserted in the system.

Continuing with the description of the operation of the system 1, upon the simultaneous receipt of a REQUEST from two or more of the CPU's in the system 1, the priority circuit 11 in all of the CPU's makes a decision awarding priority to one of the CPU's. Since all of the priority circuits 11 in the system are identical, the same decision is made by all of the priority circuits. Since the same decision is made by all of the priority circuits, the control signal awarding priority to a particular CPU does not have to be transmitted to the other CPU's, but is simultaneously available to all the CPU's in the system on the line 24.

After a CPU is awarded priority, and, if the instruction or group of instructions being executed by the requesting CPU awarded priority requires that the other CPU's be serialized, the CPU which is awarded priority generates and transmits a control signal, i.e. issues an order called SERIALIZE YOURSELF (ORDER), to all the other CPU's in the system on one of the lines 27-30 and thereafter drops its REQUEST. The REQUEST is dropped by means of a DROP REQUEST control signal generated by the order generator 13 which is sent to the request register 12 on the line 48. At the same time as the ORDER is sent to the other CPU's, the request register sends a REQUEST LOCAL SERIALIZATION control signal to the circuit 15 on the line 46 to cause the requesting CPU to serialize itself. After issuing the ORDER to all of the other CPU's in the system, the ordering CPU waits until it receives a SERIALIZATION COMPLETE (ACK) signal from all of the other CPU's in the system on the lines 35-38, which is indicated by a signal on the line 53, and a LOCAL SERIALIZATION COMPLETE signal from the circuit 15 on the line 52.

Both the circuit 14 and the circuit 15 receive inputs from the instruction processor 6 and the circuit 14 delivers inputs to the processor 6 in the course of performing the necessary serialization operations. Of course, the circuit 14 is used when an ORDER is received from another CPU and circuit 15 is used by the CPU issuing the ORDER. Also, the INPUT SELECT control signal on the line 49 causes the circuit 17 to select among its inputs on the lines 24, 52 and 53 depending on whether serialization of other CPU's or only arbitration is required.

When the ARB/SER COMPLETE circuit 17 receives the signals on the lines 52, 53 and 24, it sends a signal to the instruction processor 6 on the line 54. Thereafter, processor 6 completes the execution of the instruction or other operation which gave rise to the REQUEST and then drops the ORDER by sending a DROP ORDER control signal to the order generator 13 on the line 50.

As soon as a CPU which has been awarded priority and has issued an ORDER drops its REQUEST, a second CPU in the system with a REQUEST pending, or newly generated, and then having the highest priority will be awarded priority in the manner described above. However, the second CPU will not issue an ORDER to the other CPU's until the first CPU drops its ORDER. The processing of the REQUEST of the second CPU and the awarding of priority thereto, even though the second CPU is not permitted to issue an ORDER until the pending ORDER has been dropped, results in an overlapping of operations and a significant savings in processing time especially when multiple simultaneous REQUESTS are made.

At this point, it should be noted that the making of a REQUEST by a CPU is not intended to imply that the requesting CPU always requires that the other CPU's be serialized. For example, a requesting CPU may require that the execution of a group of instructions be completed without interruption as might occur if another CPU made a REQUEST, was granted priority and issued an ORDER. In such a case, the instruction processor 6 sends a special REQUEST to the register 12 on the line 45. The register 12 then sends a REQUEST to its priority circuit 11 and the priority circuit 11 in the other CPU's and an ARBITRATION ONLY control signal to its order generator 13 for preventing the generation of an ORDER, if the CPU is awarded priority. Thereafter, if the requesting CPU is awarded priority, the instruction processor 6 causes the request generator 12 to hold the REQUEST until the group of instructions involved is executed. By holding its REQUEST, the requesting CPU effectively prevents any other CPU from obtaining priority.

While two embodiments of the present invention are described above, it is contemplated that various modifications may be made to the embodiments described without departing from the spirit and scope of the present invention. For example, while a multiprocessor system comprising four CPU's is described, other systems comprising more or less than four CPU's may be made with the present invention. Accordingly, it is intended that the embodiments described be considered only as illustrative of the invention and that the scope thereof be determined by reference to the claims hereinafter provided.

What is claimed is:

1. A distributed multiprocessor system comprising:
   a plurality of distributed central processing units (CPUs) for processing data in response to instructions, wherein each given CPU in said plurality of distributed CPUs comprises:
   means, responsive to a predetermined instruction in said given CPU, for generating a REQUEST TO SERIALIZE OTHER CPUs signal (REQUEST);
   means, connected to the REQUEST generating means in said given CPU, for transmitting a REQUEST generated by said REQUEST generating means in said given CPU to all of said plurality of distributed CPUs;
   means, coupled to said REQUEST transmitting means in said plurality of distributed CPUs and having a plurality of outputs, for simultaneously supplying at said outputs all REQUESTs simultaneously generated by CPUs in said plurality of distributed CPUs, including
   a plurality of inputs for receiving REQUESTS from all CPUs in said system; and
   a delay circuit means for providing in series with each of said plurality of inputs a predetermined delay having a magnitude which is inversely proportional to an amount of time it takes to transmit a REQUEST from a sending CPU to one of said plurality of inputs; and
   means, connected to receive REQUESTs from said plurality of outputs and responsive to simultaneously received REQUESTs, for awarding priority to one REQUEST from a single CPU of said simultaneously received REQUESTs for processing by said given CPU.

2. A system according to claim 1 wherein each said given CPU further comprises:
   means, which is responsive to an award of priority from said priority awarding means to said given CPU, :or generating a SERIALIZE YOURSELF ORDER signal (ORDER) and a REQUEST LOCAL SERIALIZATION signal;
   means, responsive to the REQUEST LOCAL SERIALIZATION signal generated by said given CPU, for performing a local serialization operation and generating a local serialization complete signal;
   means for transmitting said ORDER from said ORDER generating means to other CPU's in said plurality of distributed CPUs;
   means, which is responsive to said generation of said ORDER, by said given CPU, for dropping said one REQUEST from said given CPU;
   means, for receiving ORDERS transmitted from all other CFU's in said system, performing a serialization operation subject of a received ORDER, and transmitting a serialization complete signal (ACK) to other CPU's in said system when the serialization operation subject of the received ORDER is completed at said given CPU;
   means, responsive to a serialization complete signal (ACK) which is received from other CPU's in said system when said CPU's have completed a serialization operation in response to said generated and transmitted ORDER, for generating an OTHER CPU's serialized signal; and
   means, responsive to said OTHER CPU's serialized signal and to said local serialization complete signal, for completing the predetermined instruction and dropping said ORDER after completing the predetermined instruction.

3. A system according to claim 1 wherein said delay circuit means comprises:
   a plurality of delay circuits; and
   selector means for coupling in series with each output of said plurality of inputs a predetermined number of said delay circuits, said predetermined number being inversely proportional to the amount of time it takes to transmit a REQUEST from a sending CPU to one of said plurality of inputs.

4. A distributed multiprocessor system comprising:
   a plurality of distributed central processing units (CPUs) for processing data in response to instructions, wherein each given CPU in said plurality of distributed CPUs comprises:
   means, responsive to a predetermined instruction in said given CPU, for generating a REQUEST TO SERIALIZE OTHER CPUs signal (REQUEST);
   means, connected to the REQUEST generating means in said given CPU, for transmitting a REQUEST generated by said REQUEST generating means in said given CPU to all of said plurality of distributed CPUs;
   means, coupled to said REQUEST transmitting means in said plurality of distributed CPUs and having a plurality of outputs, for simultaneously supplying at said outputs all REQUESTs simultaneously generated by CPUs in said plurality of distributed CPUs; and
   means, connected to receive REQUESTS from said plurality of outputs and responsive to simultaneously received REQUESTs, for awarding priority to one REQUEST from a single CPU of said simultaneously received REQUESTs for processing by said given CPU; wherein said REQUEST generating means comprises means, responsive to an instruction requiring the execution of a predetermined operation without interruption and without serializing other CPU's in the system, for holding said REQUEST once priority is granted to said CPU to prevent other CPU's in the system from being granted priority until after completion of the execution of said predetermined operation.

5. A method of arbitration between requests for serialization of a plurality of distributed central processing units (CPUs) in a multiprocessor system in which each of said plurality of CPUs comprises a priority circuit having a plurality of inputs, and a means for generating a REQUEST TO SERIALIZE OTHER CPUs control signal (REQUEST) in response to an instruction comprising steps of:
   transmitting a REQUEST from one or more of said plurality of CPUs to said priority circuit in each of said plurality of CPUs in such a manner that all REQUESTs simultaneously generated by said plurality of CPUs are simultaneously received by said priority circuits in all of said plurality of CPUs; and
   awarding priority to a determined one REQUEST of the simultaneously received REQUESTs in the priority circuit in all of said plurality of CPUs; wherein said transmitting step further comprises a step of:

providing in series with each of said plurality of inputs of said priority circuits a predetermined delay between the means for generating in one of the plurality of CPUs and a corresponding one of said plurality of inputs, the predetermined delay having a magnitude which is inversely proportional to an amount of time it takes to transmit a REQUEST from a sensing one of said plurality of CPUs to a corresponding one of said plurality of inputs.

6. A method of arbitration between and serialization of a plurality of central processing units (CPUs) in a multiprocessor system in which each of said plurality of CPUs comprises a priority circuit having a plurality of inputs, and a means for a generating a REQUEST TO SERIALIZE OTHER CPUs control signal (REQUEST) comprising steps of:

transmitting a REQUEST from one or more of said plurality of CPUs to said priority circuit in each of said plurality of CPUs in such a manner that all REQUESTs simultaneously generated by said plurality of CPUs are simultaneously received by said priority circuits in all of said plurality of CPUs; and awarding priority to a determined one of the plurality of CPUs which generated one REQUEST of the simultaneously received REQUESTs in the priority circuit in all of said plurality of CPUs;

generating, in an ORDER generating means located in the determined one of the plurality of CPUs, a SERIALIZE YOURSELF control signal (ORDER);

performing a local serialization operation in the determined one CPU which generates said ORDER;

transmitting said ORDER from said ORDER generating means to a remainder of said plurality of CPU's;

executing, in response to said ORDER in each of the remainder of said plurality of CPU's receiving said ORDER, a serialization operation;

generating, in an ACK generating means located in each of the remainder of said plurality of CPU's executing said serialization operation, a SERIALIZATION COMPLETED control signal (ACK) when said execution of said serialization operation is completed;

transmitting said ACK from each of said ACK generating means to said determined one CPU;

dropping said REQUEST in response to said ORDER in said determined one CPU; and completing the instruction in said determined one CFU and thereafter dropping said ORDER in response to receipt of said ACK from said other CPU's and upon the completion of said local serialization operation in said determined one CPU.

7. A method of arbitration between requests for serialization of a plurality of distributed central processing units (CPUs) in a multiprocessor system in which each of said plurality of CPUs comprises a priority circuit having a plurality of inputs, and a means for generating a REQUEST TO SERIALIZE OTHER CPUs control signal (REQUEST) in response to an instruction comprising steps of:

transmitting a REQUEST from one or more of said plurality of CPUs to said priority circuit in each of said plurality of CPUs in such a manner that all REQUESTs simultaneously generated by said plurality of CPUs are simultaneously received by said priority circuits in all of said plurality of CPUs; and awarding priority to a determined one REQUEST of the simultaneously received REQUESTS in the priority circuit in all of said plurality of CPUs, wherein said transmitting step further comprises steps of:

providing a plurality of delay circuits; and coupling a predetermined number of said delay circuits in series between each of said plurality of inputs of said priority circuits and a corresponding one of said plurality of CPUs, said predetermined number being inversely proportional to an amount of time it takes to transmit a REQUEST to said one of said plurality of inputs from a corresponding one of said plurality of CPUs.

8. A method according to claim 6, further comprising a step of holding, in response to an instruction requiring execution of a predetermined operation without interruption and without serializing other CPUs in the system, a REQUEST in a CPU once priority has been granted to said CPU to prevent other CPUs in the system from being granted priority until after completion of execution of said predetermined operation.

9. The system of claim 1, wherein said means for awarding priority in all of said plurality of distributed CPUs comprise identical priority circuits.

* * * * *